Nov. 10, 1942.  E. J. S. BROWN ET AL  2,301,362
BRAKE TESTING APPARATUS
Filed Aug. 6, 1941   2 Sheets-Sheet 1
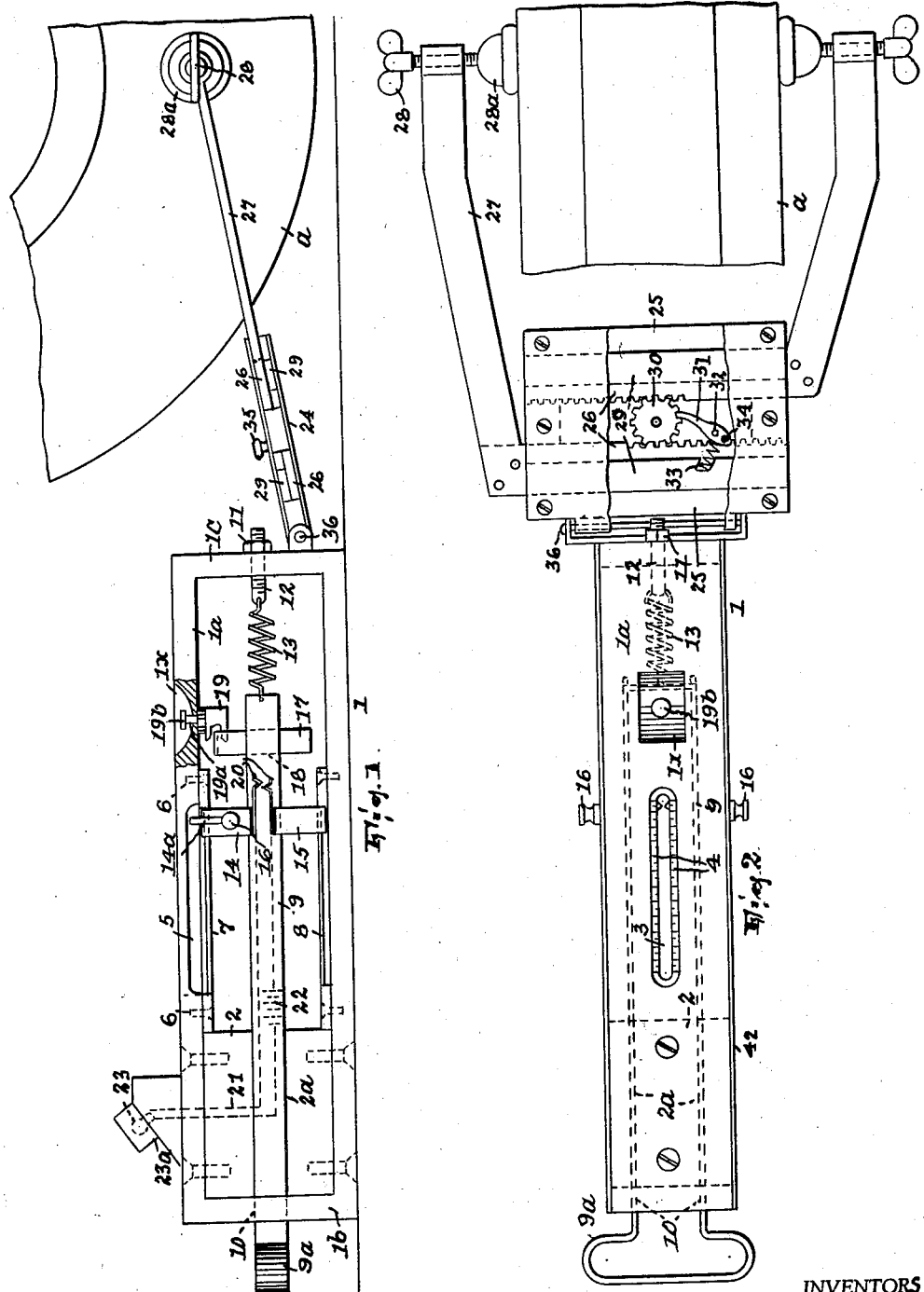
INVENTORS.
Edward J. S. Brown and
Frederick Grimshaw,
BY
ATTORNEY.

Nov. 10, 1942.     E. J. S. BROWN ET AL     2,301,362
BRAKE TESTING APPARATUS
Filed Aug. 6, 1941     2 Sheets-Sheet 2
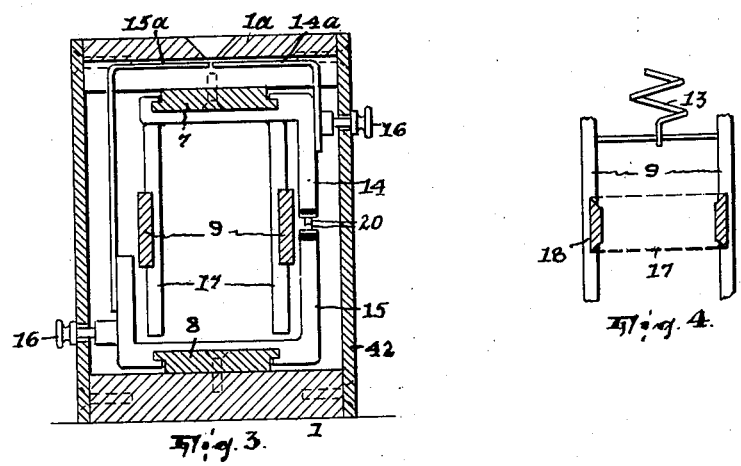
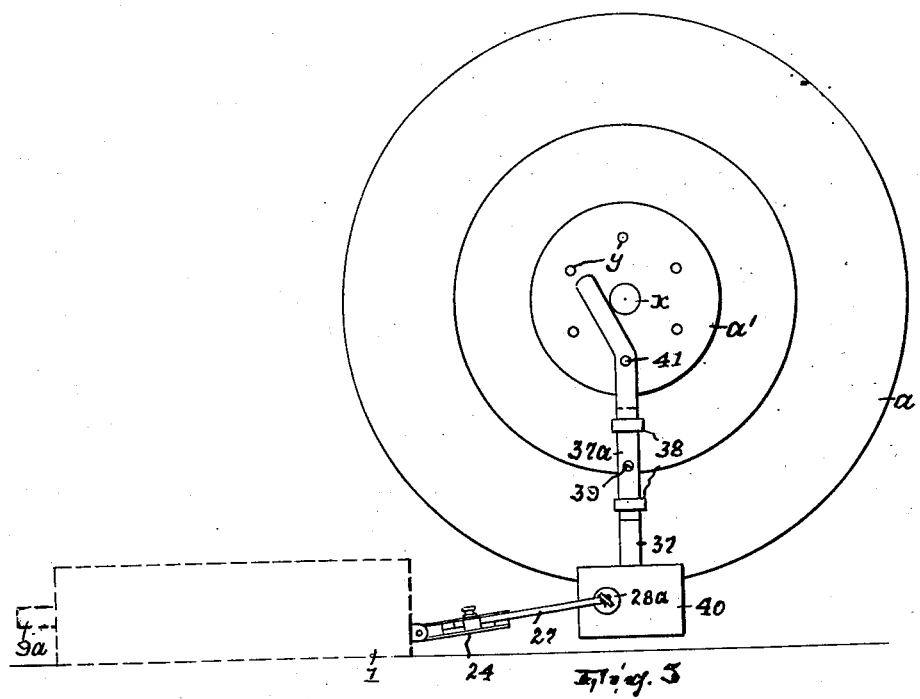
INVENTORS,
Edward J. S. Brown and
Frederick Grimshaw,
BY John W. Steward,
ATTORNEY.

Patented Nov. 10, 1942

2,301,362

UNITED STATES PATENT OFFICE 2,301,362

BRAKE TESTING APPARATUS

Edward J. S. Brown, Wanaque, and Frederick Grimshaw, Haskell, N. J.

Application August 6, 1941, Serial No. 405,604

4 Claims. (Cl. 265—1)

This invention relates to apparatus for testing the brakes of a vehicle, as an automobile. In accordance with the invention there is a support which may rest on the ground or other surface and is adapted to be coupled, preferably by the means hereinafter set forth, with an eccentric point of the braked wheel with the latter jacked up off the ground (or it may be some other rotary braked element), and this support affords a purchase for an elastic distortable system through which force is exerted in the effort to move the support and hence turn the wheel against the resistance of its brake. The support and said system preferably have coactive means to indicate when said system has been distorted to the extent at which the brake slips. But the ultimate object of the invention is to provide an apparatus by which the brakes of two or more wheels of a vehicle may be tested to determine if they have a substantially balanced braking resistance.

Another object is to provide for coupling the apparatus with any wheel or equivalent by means which may be readily applied and obtain effective grip on the wheel, as its yielding tire.

In the drawings:

Fig. 1 is a side elevation of the improved apparatus, the coupling means and a fragment of a wheel, a part of the apparatus appearing in section;

Fig. 2 is a plan of what is shown in Fig. 1 with certain elements omitted;

Fig. 3 is a transverse section in a plane immediately at the left of the members 14—15 in Fig. 1;

Fig. 4 shows a fragment of the shifter and spring in plan and member 17 in horizontal section; and Fig. 5 shows in side elevation said apparatus, coupling means and wheel, with the coupling means engaged with an intermediary lever itself engaged with wheel-supporting drum $a'$.

The mentioned support is formed as follows: 1 is an elongated rectangular frame open laterally and having fast in one end thereof a block 2; it is to be closed at each side to form a housing, as will appear. The upper wall 1a of the frame may have a longitudinal slot 3 provided at its sides with a binary scale 4 which will have graduated indices reading from right to left, and with which certain pointers coact; 5 is an underneath recess in such wall. Affixed by screws 6 to the inner faces of the top and bottom walls of the frame are T-shaped rails 7 and 8 which form guideways extending lengthwise of said walls, the upper guideway bridging recess 5.

A manually actuated shifter 9, here elongated U-shaped and providing at one end a handle 9a, is movable back and forth lengthwise of the guideways. Hence wall 1b of the element formed by the aforesaid housing has apertures 10 penetrated by the legs of the other element, or shifter, and the block has grooves 2a receiving said legs. Bearing against end wall 1c of the frame is an adjusting nut 11 into which is tapped a screw 12 penetrating said wall and connected to the adjoining end of the shifter by a spring 13.

Arranged to be moved back and forth, on the respective guideways in the present example, are two indicator members 14 and 15, as slides, each grooved to receive and be confined to its guideway while movable lengthwise thereof. Member 14 is L-shaped and member 15 U-shaped. They may have pointers 14a—15a to coact with the scale 4, being accommodated in recess 5 and having their terminals exposed by the slot. Said members have knobs 16 for shifting them.

17 is a vertically shiftable abutment or motion-transmitting member carried by the shifter, being here inverted U-shaped and having its legs dovetailed in cross-section and movable in grooves 18 in the legs of the shifter, preferably subject to some friction so that member 17 will remain at any elevation to which it is displaced. The top or cross-portion of this member is to be received in the fork of a vertically movable setting member 19 having an upstanding stem 19a penerating and preferably fitting an aperture in the top wall of the frame, which latter has a recess 1x in which a knob 19b on the stem is housed.

The vertical limits of movement of member 17 are such that when it is fully elevated it may engage member 14, and when it is fully depressed it may engage member 15, on moving the shifter to the left, by a pull on its handle 9a.

Suppose it is desired to test the brake-resistance active on a single wheel or other rotary element, as $a$ in Fig. 1, and that there is means to couple the mentioned support with an eccentric point of the wheel, as here below its axis, the wheel being jacked up off the ground. For this purpose the abutment 17 may be at their either of its said limits. The operator pulls on the handle 9a to tension the spring and that one of members 14—15 with which the abutment is positioned to engage will be shifted to the left until the brake slips; the pointer of the said member will indicate on the scale the degree of brake resistance existing at the moment of slippage. If such resistance is more or less than is required as shown by the pointer and scale the brake of such wheel may now be adjusted to change the resistance, whereupon the test is repeated.

But, as indicated, the ultimate object is to test two or more wheels on the vehicle to determine if their brake-resistances are substantially equal. Hence, having determined the brake-resistance of one wheel the abutment is shifted by device 19 to its opposite position so that it will now engage the other indicator member and then the brake-resistance of each of the other wheels is tested in the same way as before; but for this purpose that indicator member which was first moved by the abutment (when the latter was in its original position, for testing the brake of the first wheel), is left where it was so that its pointer and the scale will together serve as an index for the testing of the brake of any succeeding wheel.

Means is provided whereby whenever, after the brake-resistance of the first wheel has been determined, that of another wheel is to be tested the operator will be signalled when the test in the latter case shows that the brake-resistance is at least of the same degree as that of the first wheel. The two slides 14—15 are equipped with insulated spring contacts 20 one of which (here the lower one, assumed to be used for testing the brake-resistance of the first wheel) has a slight lead on the other when the two slides are at their idle or right-hand limits shown by Fig. 1. These form the terminals of an electric circuit 21 having a battery at 22 and containing a lamp 23, here in a suitable housing 23a mounted on the support. Having, on the first test, moved the lower slide to the left and left it there on the first test, when on effecting another test the other slide is moved the closing of the circuit ignites the lamp. The contacts may yield so as to pass each other.

Effective and readily adjustable means to couple the apparatus with the wheel to be tested is provided as shown by Figs. 1 and 2. A casing is formed by a flat shell 24 whose two main or parallel walls have secured between them parallel guide-bars 25 against the relatively inner sides of which slide racks 26 having at relatively opposite ends curved arms 27 equipped with thumb-screws 28 having tire-engaging pads 28a universally jointed thereto. One rack is spaced from one and the other from the other of said walls of the casing by a spacer-bar 29. The two racks are engaged with a pinion 30 which, in cooperation with a pawl 31, opposes movement of the racks in the direction to shift their arms apart. The pawl is pivoted at 32 in the near wall of the casing. A spring 33 interposed between the outer arm of the pawl and one of the guide-bars normally holds the pawl engaged with the pinion. This arm may have a projecting portion, as a stud, 34 for manually disengaging the pawl from the pinion, the same to extend through a suitable slot (not shown) in the near wall of the casing and be provided with a knob 35. The coupling device thus formed is pivoted to the shifter on a horizontal transverse spindle 36. To attach it to the (rubber or other yielding) tire of the wheel its racks are forced together until the pads obtain a substantial grip on the tire, in which state they will be held by the pawl; the racks may be released for movement apart by manually disengaging the pawl from the pinion.

As shown by Fig. 5 the apparatus may be used to test the brake resistance of the wheels of a vehicle having its chassis supported through the medium of so-called "knee-action" means, in which case it is usually necessary to remove the wheel. An extensible lever is formed by two bars 37—37a confined to move lengthwise of each other by bands 38, the bars being adapted to be clamped together so as to vary the over-all length of the lever by a set-screw 39. Bar 37 may have an enlarged head 40 to be gripped by the pads 28a and bar 37a has its free end bent off somewhat and at the bend is formed with a hole 41. When hub-cap is removed to expose the axle x and the wheel-securing screws y of the brake-drum the lever is positioned as shown or so that one of the screws penetrates the hole 41 and lever bar 37a bears against the axle. The testing is performed the same as already described, except that the pull is applied directly to the brake-drum.

The element including frame 1 is formed as a housing for the indicator members and abutment by cover plates 42 secured to the open sides of the frame.

Of course, other gearing than that afforded by the pinion 30 may be used to connect the racks of the coupling means; and the detent means to oppose movement apart of the racks (such means being here formed by the mentioned pawl) may engage any part of the system formed by the racks and gear in this example.

Having thus fully described our invention, what we claim is:

1. A brake-testing apparatus including a pair of elements each confined by the other to movement in a rectilinear path and one forming a housing having a slot extending lengthwise of said path and one including a handle and the other a coupling to connect said apparatus with an eccentric point of a rotary braked part, a spring housed within the housing and yieldingly resisting displacement of the handle-including element relatively to the coupling-including element from a given position, a pair of indicator members housed within the housing and confined by one of the said elements to move thereon from a given position independently of each other throughout the length of the slot and each having a pointer exposed by the slot, and an abutment housed within the housing and confined by the other element against movement relatively thereto lengthwise but shiftable therein crosswise of said path into position to abut either but clear the other member when the handle-including element is displaced relatively to the other element against the tension of the spring.

2. A brake-testing apparatus including a pair of elements each confined by the other to movement in a rectilinear path and one forming a housing having a slot extending lengthwise of said path and one including a handle and the other a coupling to connect said apparatus with an eccentric point of a rotary braked part, a spring housed within the housing and yieldingly resisting displacement of the handle-including element relatively to the coupling-including element from a given position, a pair of indicator members housed within the housing and confined by one of the said elements to move thereon from a given position independently of each other throughout the length of the slot and each having a pointer exposed by the slot, an abutment housed within the housing and confined by the other element against movement relatively thereto lengthwise but shiftable therein crosswise of said path into position to abut either but clear the other member when the handle-including element is displaced relatively to the other element against the tension of the spring, and a device, protruding from and movable in the housing crosswise of said path and engaged with the abutment, to move the latter crosswise of said path.

3. A brake-testing apparatus including a pair of elements each confined by the other to movement in a rectilinear path and one forming a housing having a slot extending lengthwise of said path and one including a handle and the other a coupling to connect said apparatus with an eccentric point of a rotary braked part, a spring housed within the housing and yieldingly resisting displacement of the handle-including element relatively to the coupling-including element from a given position, a pair of indicator members housed within the housing and confined by one of the said elements to move thereon from a given position independently of each other throughout the length of the slot and each having a pointer exposed by the slot, an abutment housed within the housing and confined by the other element against movement relatively thereto lengthwise but shiftable therein crosswise of said path into position to abut either but clear the other member when the handle-including element is displaced relatively to the other element against the tension of the spring, and signalling means including devices carried by and movable with the respective members and each projecting into the path of movement of the other.

4. A brake-testing apparatus including a pair of elements each confined by the other to movement in a rectilinear path and one forming a housing and the other having a pair of parallel legs horizontally displaced from each other and extending lengthwise of said path and into the housing, one element having a handle and the other a coupling to connect said apparatus with an eccentric point of a braked rotary part and the housing having at its top a slot extending lengthwise of said path, a pair of upper and lower indicator members housed within the housing and slidable thereon lengthwise of said path independently of each other throughout the length of the slot and having pointers exposed by said slot, and an upright abutment supported by said legs of the one element and confined thereby against movement lengthwise thereof but shiftable vertically therein into position to abut either but clear the other member when one of said elements is displaced relatively to the other.

EDWARD J. S. BROWN.
FREDERICK GRIMSHAW.